(12) United States Patent
Moon et al.

(10) Patent No.: US 6,735,965 B2
(45) Date of Patent: May 18, 2004

(54) AIR CONDITIONING APPARATUS AND CONTROL METHOD THEREOF

(75) Inventors: Je-Myoung Moon, Suwon (KR); Jong-Youb Kim, Suwon (KR); Dong-Kue Lee, Pyungtak (KR); Il-Yong Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/305,176

(22) Filed: Nov. 27, 2002

(65) Prior Publication Data

US 2003/0230098 A1 Dec. 18, 2003

(30) Foreign Application Priority Data

Jun. 14, 2002 (KR) .................................... 2002-0033221

(51) Int. Cl.$^7$ ................................................. F25B 7/00
(52) U.S. Cl. ............................. 62/175; 62/193; 62/510
(58) Field of Search ............................ 62/175, 228.4, 62/228.5, 510, 197, 199, 193, 470

(56) References Cited

U.S. PATENT DOCUMENTS

| 4,383,802 A | * | 5/1983 | Gianni et al. ................. 417/12 |
|---|---|---|---|
| 4,676,072 A | * | 6/1987 | Higuchi ........................ 62/175 |
| 4,870,831 A | * | 10/1989 | Kitamoto ........................ 62/84 |
| 4,876,859 A | * | 10/1989 | Kitamoto ...................... 62/117 |
| 5,050,397 A | * | 9/1991 | Sugiyama et al. ............. 62/175 |
| 5,735,139 A | * | 4/1998 | Lord et al. ..................... 62/470 |
| 6,018,957 A | * | 2/2000 | Katra et al. .................... 62/175 |
| 6,394,120 B1 | | 5/2002 | Wichert |
| 6,401,469 B1 | | 6/2002 | Dennis et al. |

FOREIGN PATENT DOCUMENTS

JP       08-178437   *   7/1996   ............. F25B/1/00

OTHER PUBLICATIONS

U.S. patent application Ser. No. 10/305,117, Moon et al., filed Nov. 27, 2002, Samsung Electronics Co., Ltd.

* cited by examiner

*Primary Examiner*—Marc Norman
(74) *Attorney, Agent, or Firm*—Staas & Halsey LLP (57) ABSTRACT

An air conditioning apparatus and control method thereof includes an inverter-type compressor and a two-stage variable-capacity compressor connected in parallel with their respective capacities controlled according to indoor air conditioning loads. Thus, the present invention is cost-competitive due to a capacity of the inverter-type compressor being lower than that of the two-stage variable-capacity compressor.

17 Claims, 7 Drawing Sheets

AIR CONDITIONING APPARATUS AND CONTROL METHOD THEREOF

CROSS-REFERENCE TO RELATED APPLICATION

This application claims the benefit of Korean Application No. 2002-33221, filed Jun. 14, 2002, in the Korean Industrial Property Office, the disclosure of which is incorporated herein by reference.

BACKGROUND OF THE INVENTION

1. Field of the Invention

The present invention relates generally to an air conditioning apparatus and control method thereof, which has an inverter-type compressor and a two-stage variable-capacity compressor.

2. Description of the Related Art

Generally, a single air conditioning apparatus in which one indoor unit is connected to one outdoor unit does not have a large indoor air conditioning load (required capacity). Thus, in the single air conditioning apparatus, a fixed-capacity compressor is installed in the outdoor unit.

In contrast, a multi-unit air conditioning apparatus in which a plurality of indoor units are connected to one outdoor unit is designed such that each of the indoor units independently copes with an air conditioning load of a corresponding indoor space. In the multi-unit air conditioning apparatus, since the air conditioning loads of the respective indoor units are different and varied at any time, a variable-capacity compressor is installed in the outdoor unit. Accordingly, a flow of refrigerant is controlled by ascertaining the loads and operating states of the indoor units using communications between each of the indoor units and the outdoor unit. Typically, the variable-capacity compressor is controlled by a microcomputer of the outdoor unit. The microcomputer checks air conditioning requirements with respect to a corresponding indoor space, a temperature condition of the corresponding indoor space, etc., on the basis of information received from each of the indoor units, and controls a capacity of the compressor according to the checked information.

However, since the conventional multi-unit air conditioning apparatus employs a construction in which the plurality of indoor units are connected to the one outdoor unit, the compressor installed in the outdoor unit must be designed to endure a maximum indoor air conditioning load. Further, in order for the compressor to endure the maximal indoor air conditioning load, significant difficulty arises in production of the compressor. That is, a plurality of performance tests must be carried out so as to increase the capacity of the compressor. A high-capacity compressor produced by the above process is problematic in that it is very expensive, relative to a conventional compressor.

Figure 1:
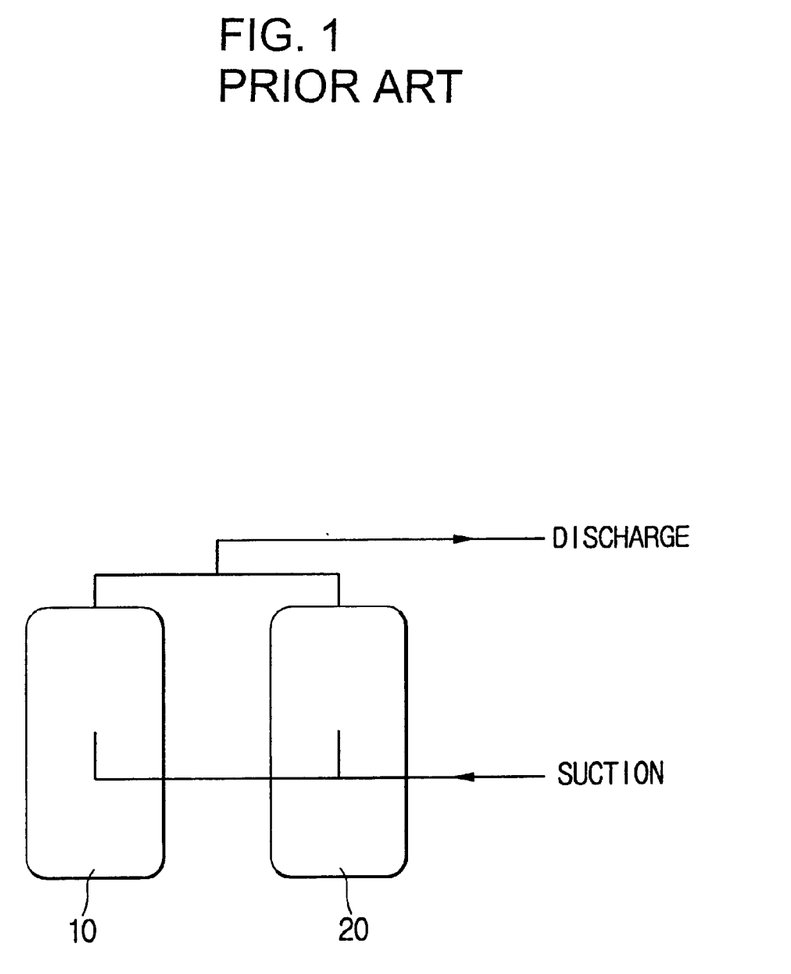
FIG. 1 is a view showing a construction of a conventional air conditioning apparatus in which a variable-capacity compressor and a fixed-capacity compressor are connected in parallel with each other.

Conventionally, a variable-capacity compressor and a fixed-capacity compressor are mixed to cope with indoor air conditioning loads in consideration of the above problem. As shown in FIG. 1, a compressor 10 to operate at a capacity varied according to a frequency of an inverter circuit, and a fixed-capacity compressor 20 to operate at a constant capacity are connected in parallel with each other. Further, an outdoor unit microcomputer (not shown) controls capacities of the compressors 10 and 20 according to indoor air conditioning loads (required capacities) received from respective indoor units.

Figure 2:
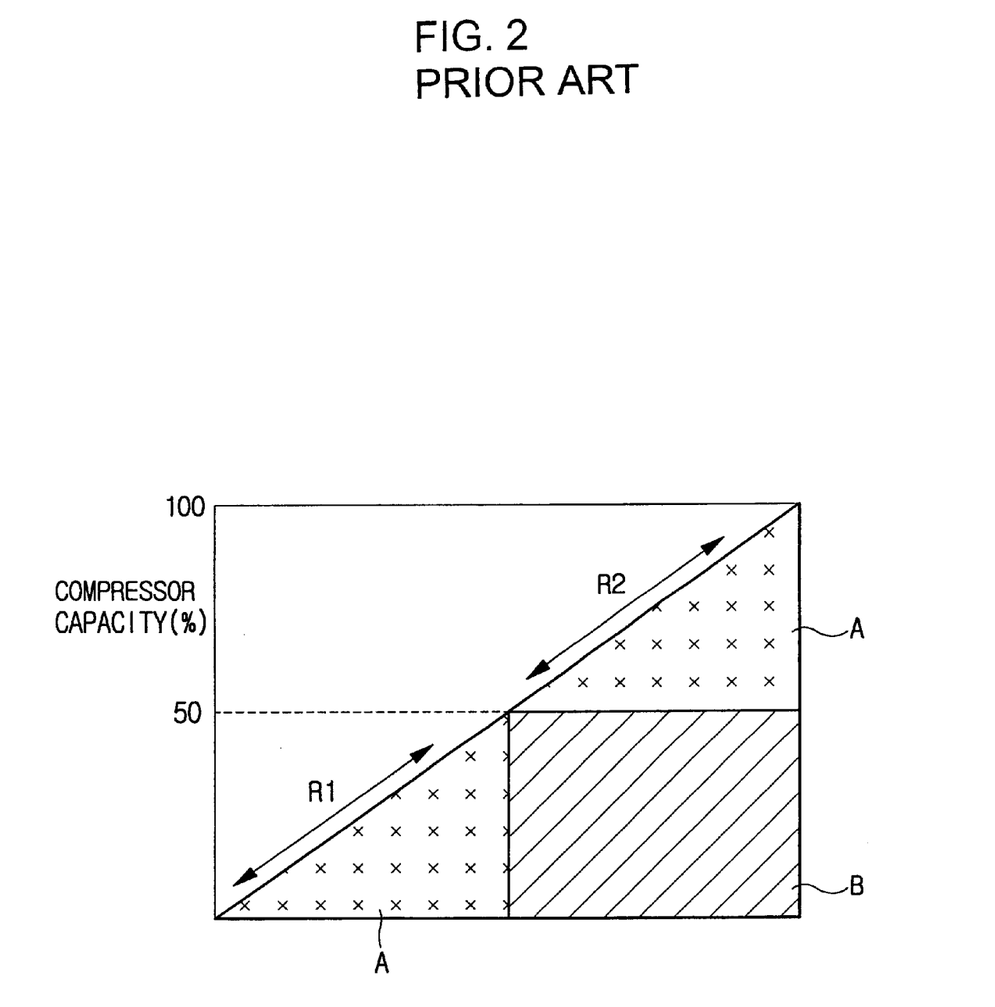
FIG. 2 is a graph showing an operation of controlling capacities of the compressors of FIG. 1.

As shown in FIG. 2, if the indoor air conditioning loads are 0 to 50%, the outdoor unit microcomputer controls the capacity of the compressor 10. In this case, the microcomputer controls the capacity of the compressor 10 by varying the frequency outputted to the compressor 10 from the inverter circuit within a predetermined range R1 according to the indoor air conditioning load received from the respect indoor units. Further, if the indoor air conditioning loads are 50 to 100%, the outdoor unit microcomputer controls the capacities of the compressors 10 and 20. In this case, the microcomputer copes with an insufficient capacity by controlling the capacity of the inverter-type compressor 10 within a predetermined range R2 after activating the fixed-capacity compressor 20.

However, if the conventional multi-unit air conditioning apparatus as described above is applied in facilities such as large buildings, the capacity which is usually covered by a variable-capacity compressor inevitably becomes large. It is difficult to produce a high-capacity compressor such as the variable-capacity compressor as an independent device. Further, a cost of the high-capacity compressor is expensive even though it may be produced as an independent device, thus causing an economic burden by increasing a price of the compressor.

Therefore, in the multi-unit air conditioning apparatus, a method is required to effectively cope with a large-scale indoor air conditioning load and accommodate requirements for a large-scale air conditioning capacity while using a conventional compressor.

SUMMARY OF THE INVENTION

Accordingly, it is an aspect of the present invention to provide an air conditioning apparatus and control method thereof, in which an inverter-type compressor and a two-stage variable-capacity compressor are connected in parallel with each other to cope with indoor air conditioning loads inexpensively.

Additional aspects and advantages of the invention will be set forth in part in the description which follows and, in part, will be obvious from the description, or may be learned by practice of the invention.

The foregoing and other aspects of the present invention are achieved by providing an air conditioning apparatus including a first compressor, a second compressor connected in parallel with the first compressor and controlled to operate at one of a minimum capacity and a maximum capacity, and a control unit to control capacities of the first and second compressors such that a total capacity of the first and second compressors is linearly controlled according to indoor air conditioning loads.

The foregoing and other aspects of the present invention are achieved by providing an air conditioning apparatus including a plurality of indoor units and an outdoor unit connected to the plurality of indoor units. The outdoor unit includes a first compressor, a second compressor connected in parallel with the first compressor and controlled to operate at one of a minimum capacity and a maximum capacity, and an outdoor control unit to control capacities of the first and second compressors such that a total capacity of the first and second compressors is linearly controlled according to indoor air conditioning loads required by the indoor units.

The foregoing and other aspects of the present invention are achieved by providing a method of controlling an air conditioning apparatus. The air conditioning apparatus has a plurality of indoor units connected to an outdoor unit, which includes a first compressor to control a capacity thereof according to a frequency of an inverter circuit, and a second compressor to operate at one of a minimum capacity and a maximum capacity. The method includes calculating an air conditioning capacity required by corresponding indoor units and controlling capacities of the first and second compressors such that a total capacity of the first and second compressors is linearly controlled according to the calculated required air conditioning capacity. A maximum capacity of the first compressor is equal to the minimum capacity of the second compressor, and the maximum capacity of the second compressor is two or more times greater than the minimum capacity of the second compressor.

The foregoing and other aspects of the present invention are achieved by providing an apparatus including two compressors connected in parallel with each other. One of the compressors is an inverter-type compressor which linearly controls a capacity thereof, and the other is a two-stage variable-capacity compressor which has a relatively large capacity and operates at two different capacities.

BRIEF DESCRIPTION OF THE DRAWINGS

The above and other aspects and advantages of the invention will become apparent and more appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3A:
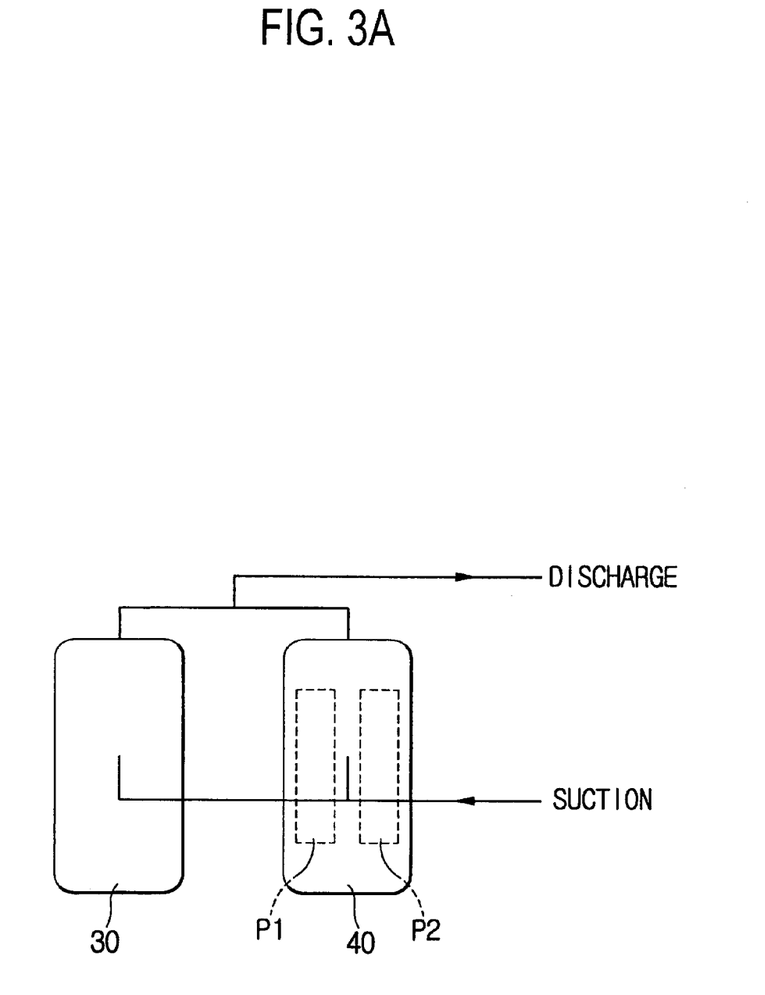
FIG. 3A is a view showing a construction of an air conditioning apparatus in which an inverter-type variable-capacity compressor and a two-stage variable-capacity compressor are connected in parallel with each other, according to an embodiment of the present invention.
Figure 3B:
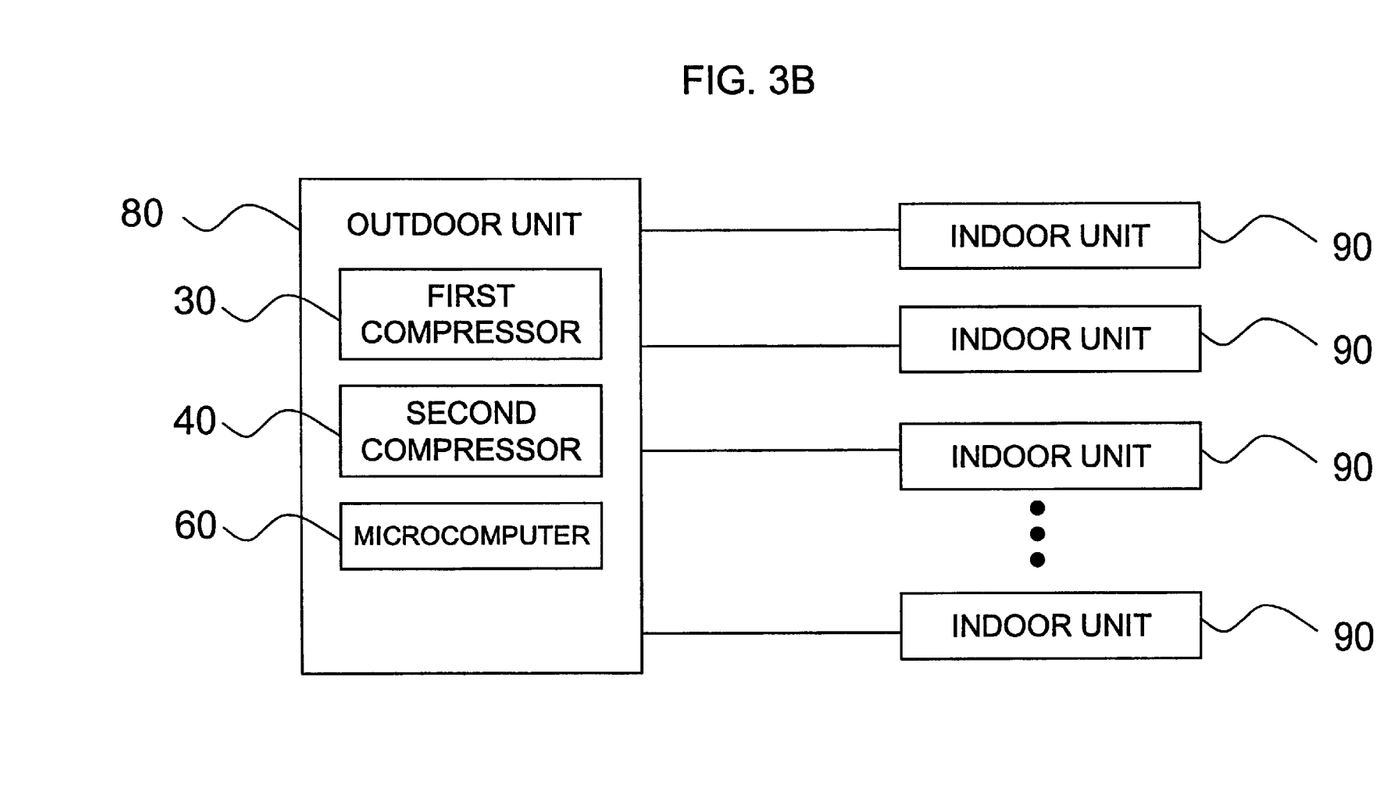
FIG. 3B is a view showing a multi-unit air conditioning apparatus, according to an embodiment of the present invention.

FIGS. 3A and 3B show a construction of an air conditioning apparatus in which an inverter-type variable-capacity compressor and a two-stage variable-capacity compressor are connected in parallel with each other, according to an embodiment of the present invention. As shown in FIG. 3A, the air conditioning apparatus of the present invention includes two compressors 30 and 40 connected in parallel with each other. The compressors 30 and 40 are applied to a multi-unit air conditioning apparatus in which a plurality of indoor units 90 are connected to one outdoor unit 80 (see FIG. 3B). The shown compressors 30 and 40 are installed in the outdoor unit 80, and their capacities are controlled with an outdoor unit microcomputer 60.

The first compressor 30 controls its capacity according to a frequency (a number of rotations) outputted from an inverter circuit (not shown) by the control of the outdoor unit microcomputer 60.

The second compressor 40 is a two-stage variable-capacity compressor which has two compressing rooms P1 and P2 therein. If a motor (not shown) in the second compressor 40 rotates forwardly according to a control instruction of the outdoor unit microcomputer, both the compressing rooms P1 and P2 perform a compression of refrigerant, so that the second compressor 40 is operated at 100% capacity, which is a maximum capacity. However, if the motor in the second compressor 40 rotates reversely according to another control instruction of the outdoor unit microcomputer, only one of the two compressing rooms P1 and P2 performs the compression of refrigerant, so that the second compressor 40 is operated at 50% capacity, which is a minimum capacity. Thus, the second compressor 40 operates at one (minimum or maximum capacity) of two different capacities determined by the outdoor unit microcomputer 60.

In the shown embodiment, a maximum capacity of the first compressor 30 is equal to the minimum capacity of the second compressor 40, and corresponds to a half of the maximum capacity of the second compressor 40. The maximum capacity of the first compressor 30 is set relatively low to reduce manufacturing cost as much as possible, since a variable-capacity compressor is expensive to manufacture relative to a fixed-capacity compressor, and a compressor becomes more expensive as its maximum capacity becomes larger. While shown in terms of compressors 30, 40, it is understood that additional compressors can be used in order to increase a total capacity.

Figure 4:
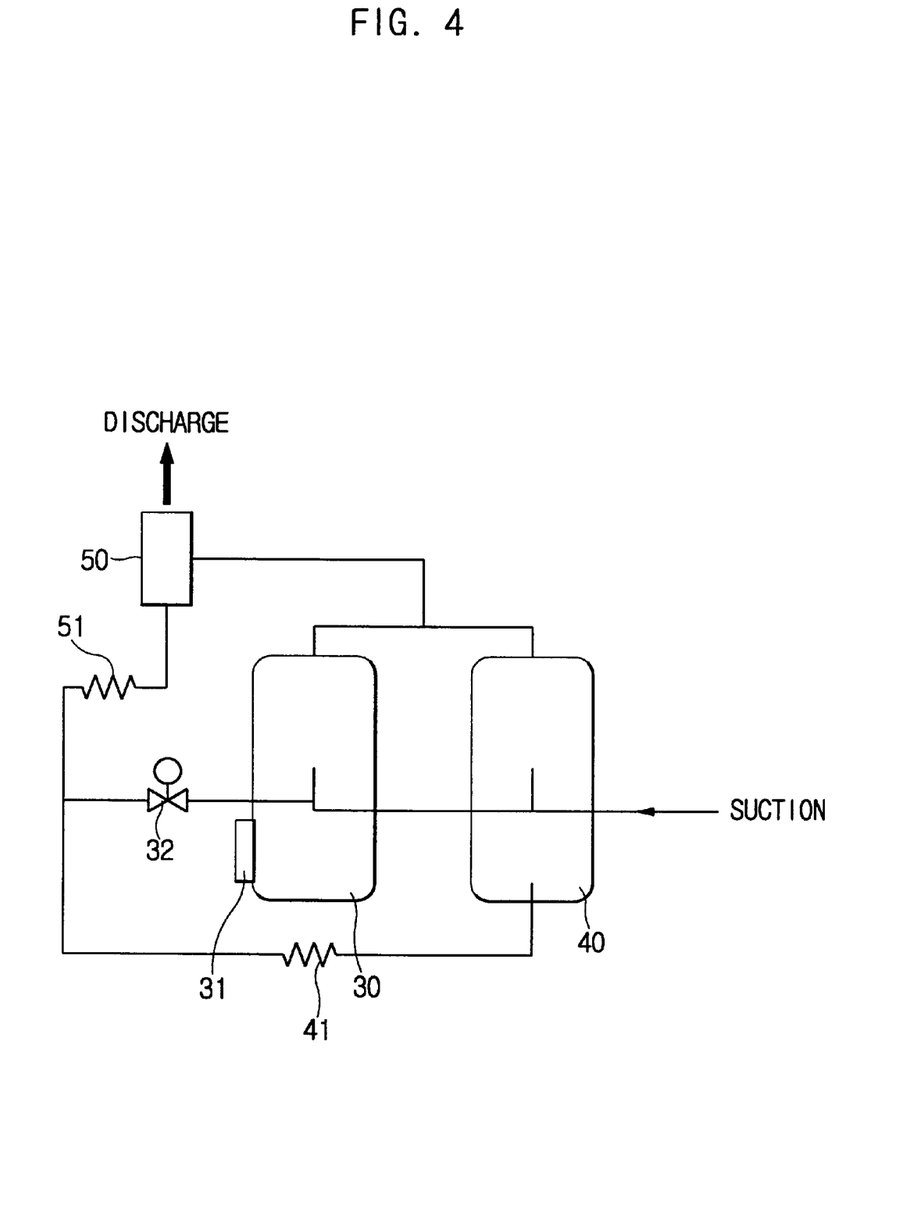
FIG. 4 is a view showing a construction in which an oil equalization device is connected to the compressors, according to an embodiment of the present invention.

A device to keep oil supplied to the first and second compressors 30 and 40 having different capacities in suitable states is required. According to an embodiment of the present invention, an oil equalization device is shown in FIG. 4. Referring to FIG. 4, the oil equalization device includes an oil separator 50, an oil sensor 31, a valve 32 and capillary tubes 41 and 51. The oil separator 50 is arranged on discharge sides of the first and second compressors 30 and 40 to separate refrigerant and oil. The oil sensor 31 is disposed between the first compressor 30 and the oil separator 50 to sense an amount of oil of the first compressor 30. The valve 32 is disposed between an outflow side of the first compressor 30 and the oil separator 50 to intercept the outflow of oil to the oil separator 50. The capillary tubes 41 and 51 are disposed between an outflow side of the second compressor 40 and the oil separator 50.

Oil separated from the refrigerant by the oil separator 50 is provided to both the first and second compressors 30 and 40. In this case, the amount of oil of the first compressor 30, sensed through the oil sensor 31, is provided to the outdoor unit microcomputer 60. The outdoor unit microcomputer 60 compares the sensed amount of oil with an amount of preset reference oil, and opens the valve 32 if it determines that the oil of the first compressor 30 is insufficient according to the compared results. Accordingly, oil in the oil separator 50 is provided to the compressors 30 and 40. At this time, most oil is first provided to the first compressor 30 due to a resistor of the capillary tube 41, and next provided to the second compressor 40 after the valve 32 is closed. By considering the above provision of the oil, it is preferable to manufacture the oil equalization device such that a flowing resistor of the capillary tube 41 is greater than that of the valve 32.

Hereinafter, an operation of the air conditioning apparatus and control method thereof, according to the present invention is described in detail with reference to FIGS. 5 and 6. It is understood that the method may be embodied as a set of instructions encoded on a computer readable medium usable by the microcomputer.

The air conditioning apparatus of the present invention is applied to a multi-unit air conditioning apparatus in which an indoor air conditioning load is highly varied. Thus, the multi-unit air conditioning apparatus includes the plurality of indoor units 90 connected to the one outdoor unit 80. The indoor units 90 and the outdoor unit 80 mutually communicate with each other, and the outdoor unit microcomputer 60 to control several compressors 30, 40 installed in the outdoor unit 80, controls capacities of the compressors 30, 40 according to indoor air conditioning loads (required capacities) received from the respective indoor units 90.

First, the outdoor unit microcomputer 60 calculates a total indoor air conditioning load (required capacity) by summing air conditioning loads received from the respective indoor units 90 of the plural indoor units 90 at operation S110.

Then, the outdoor unit microcomputer 60 determines whether the calculated total required capacity is 0 at operation S120. If the total required capacity is 0, the outdoor unit microcomputer 60 stops the operations of both the first and second compressors 30 and 40 at operation S130.

If the total required capacity is not 0 at operation S120, the outdoor unit microcomputer 60 determines whether the total required capacity is equal to or less than 33% of a total capacity of the compressors 30, 40 at operation S140. If the total required capacity is equal to or less than 33%, the microcomputer 60 stops the operation of the second compressor 40, and controls the capacity of the first compressor 30 to correspond to the calculated total required capacity by applying a frequency to the first compressor 30 through an inverter circuit, as shown in P11 of FIG. 5 at operations S150 and S160 of FIG. 6.

If the total required capacity is not equal to or less than 33% of the total capacity of the compressors at operation S140, the outdoor unit microcomputer 60 determines whether the total required capacity is equal to or less than 67% of the total capacity of the compressors at operation S170. If the total required capacity is equal to or less than 67% of the total capacity of the compressors, the outdoor unit microcomputer 60 operates the second compressor 40 to reversely rotate so as to allow the second compressor 40 to operate at the minimum capacity (with reference to B of FIG. 5), and controls the capacity of the first compressor 30 to correspond to the calculated total required capacity by applying a frequency to the first compressor 30 through an inverter circuit, as shown in P12 of FIG. 5 at operations S180 and S190 of FIG. 6.

Figure 5:
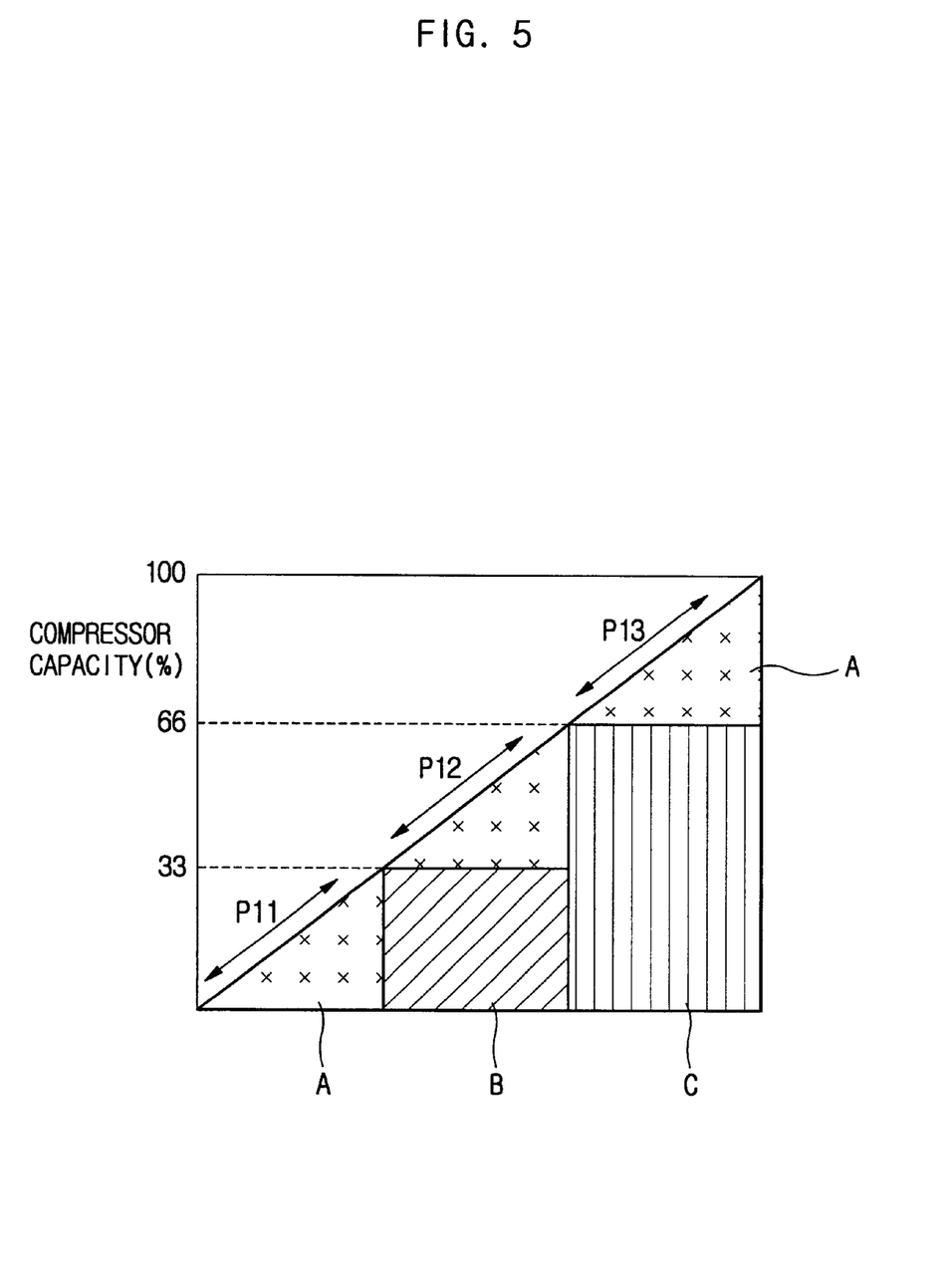
FIG. 5 is a graph showing an operation of controlling capacities of the compressors of FIG. 3.
Figure 6:
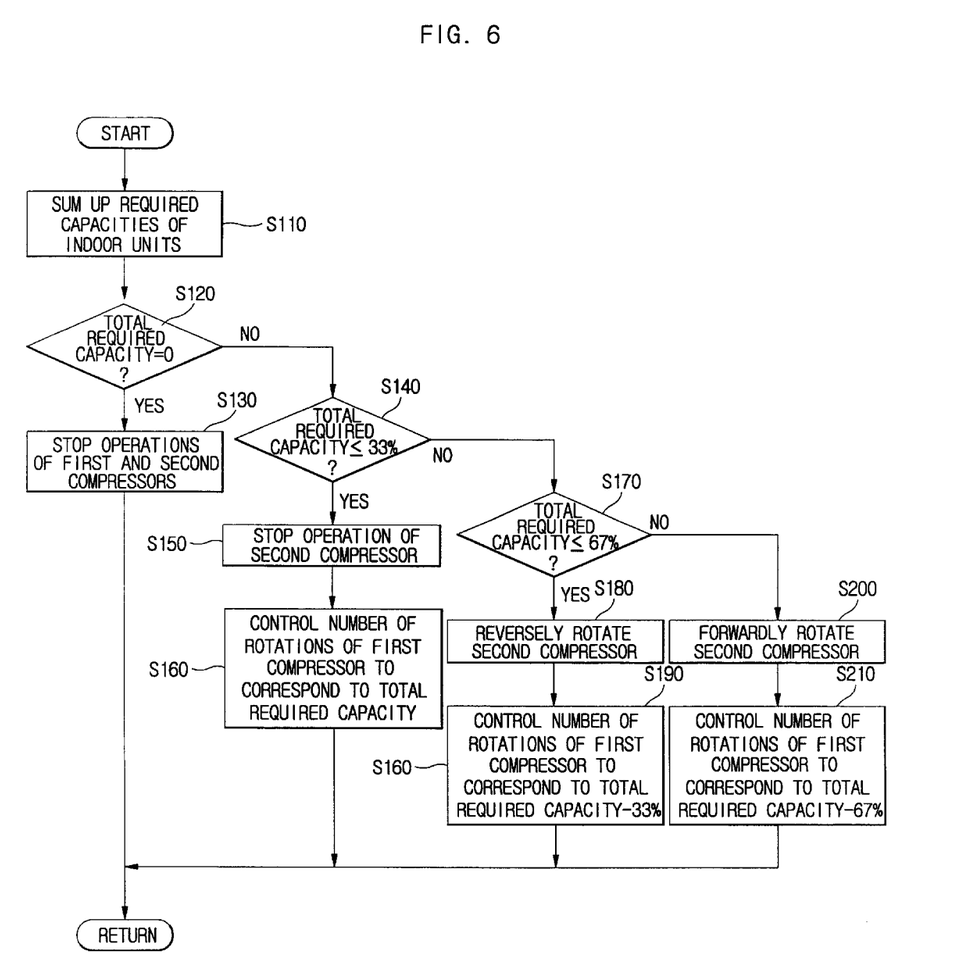
FIG. 6 is a flowchart of an embodiment of a method of controlling the air conditioning apparatus of FIG. 3.

If the total required capacity is not equal to or less than 67% of the total capacity of the compressor at operation S170, the outdoor unit microcomputer 60 operates the second compressor 40 to forwardly rotate so as to allow the second compressor 40 to operate at the maximum capacity (with reference to C of FIG. 5), and controls the capacity of the first compressor 30 to correspond to the calculated total required capacity by applying a frequency to the first compressor 30 through an inverter circuit, as shown in P13 of FIG. 5 at operations S200 and S210 of FIG. 6.

After the operations S130, S160, S190 and S210 are performed, a processing operation returns to the starting operation.

As described above, the present invention provides an air conditioning apparatus and control method thereof, in which an inverter-type variable-capacity compressor and a two-stage variable-capacity compressor are connected in parallel with each other, thus enabling capacities of the compressors to be controlled in correspondence with indoor air conditioning loads (required capacities). Further, the present invention is advantageous in that it is cost-competitive because a capacity charged by the inverter-type compressor is relatively reduced, and the cost required to manufacture the inverter-type compressor is reduced in accordance with the reduced capacity. Further, the present invention keeps oil supplied to compressors in stable states because the compressors having different capacities are connected to each other through an oil equalization device.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air conditioning apparatus, comprising:
    a first compressor having a variable capacity;
    a second compressor connected in parallel with the first compressor and controlled to operate at one of a non-zero first capacity and a non-zero second capacity; and
    a control unit to control the first and second compressors so that a total capacity of the first and second compressors is linearly controlled according to indoor air conditioning loads.

2. The air conditioning apparatus according to claim 1, wherein the variable capacity of the first compressor is controlled according to a frequency of an inverter circuit.

3. The air conditioning apparatus according to claim 2, wherein a maximum capacity of the first compressor is equal to the first capacity of the second compressor, and the second capacity of the second compressor is two or more times greater than the first capacity of the second compressor.

4. The air conditioning apparatus according to claim 1, wherein the second compressor includes two compressing rooms, operates at the second capacity by enabling both of the compressing rooms to perform compression if a motor of the second compressor rotates forwardly, and operates at the first capacity by selecting one of the two compressing rooms to perform the compression if the motor of the second compressor rotates reversely.

5. The air conditioning apparatus according to claim 1, further comprising:
    an oil equalization device to keep oil supplied to the first and second compressors stable.

6. An air conditioning apparatus, comprising:
    a first compressor having a variable capacity;
    a second compressor connected in parallel with the first compressor and controlled to operate at one of a first capacity and a second capacity;
    a control unit to control the first and second compressors so that a total capacity of the first and second compressors is linearly controlled according to indoor air conditioning loads; and
    an oil equalization device to keep oil supplied to the first and second compressors stable, wherein the oil equalization device comprises:
        an oil separator to separate refrigerant and the oil,
        an oil sensor disposed between the first compressor and the oil separator to sense an amount of the oil of the first compressor,
        a valve disposed between an outflow side of the first compressor and the oil separator to intercept an outflow of the oil to the oil separator; and
        at least one capillary tube disposed between an outflow side of the second compressor and the oil separator.

7. The air conditioning apparatus according to claim 6, wherein the control unit compares the sensed amount of the oil of the first compressor with an amount of preset reference oil to thereby determine whether or not to open the valve.

8. The air conditioning apparatus according to claim 7, wherein the oil is first provided to the first compressor due to a resistor of the capillary tube, and then provided to the second compressor after the valve is closed.

9. The air conditioning apparatus according to claim 6, wherein a flowing resistance of the capillary tube is greater than the valve.

10. The air conditioning apparatus according to claim 1, wherein the first compressor is an inverter-type compressor.

11. An air conditioning apparatus, comprising:
a plurality of indoor units; and
an outdoor unit connected to the plurality of indoor units, the outdoor unit including:
a first compressor having a variable capacity;
a second compressor connected in parallel with the first compressor and controlled to operate at one of a non-zero first capacity and a non-zero second capacity; and
an outdoor control unit to control the first and second compressors so that a total capacity of the first and second compressors is linearly controlled according to indoor air conditioning loads required by the indoor units.

12. The air conditioning apparatus according to claim 11, wherein the first compressor is an inverter-type compressor.

13. A method of controlling an air conditioning apparatus, the air conditioning apparatus having a plurality of indoor units connected to an outdoor unit, which includes a first compressor having a capacity thereof controlled according to a frequency of an inverter circuit, and a second compressor to operate at one of a first capacity and a second capacity, the method comprising:
calculating an air conditioning capacity required by the corresponding indoor units; and
controlling the first and second compressors so that a total capacity of the first and second compressors is linearly controlled according to the calculated air conditioning capacity,
wherein a maximum capacity of the first compressor is equal to the first capacity of the second compressor, and the second capacity of the second compressor is two or more times greater than the first capacity of the second compressor.

14. The method according to claim 13, wherein the controlling comprises:
stopping operations of the first and second compressors, if the calculated air conditioning capacity is 0;
stopping an operation of the second compressor and controlling the capacity of the first compressor by applying the frequency outputted from the inverter circuit to correspond to the calculated air conditioning capacity of the first compressor, if the calculated air conditioning capacity is greater than 0 and is equal to or less than the maximum capacity of the first compressor;
controlling the second compressor to operate at the first capacity and controlling the capacity of the first compressor by applying the frequency outputted from the inverter circuit to correspond to the calculated air conditioning capacity of the first compressor, if the calculated air conditioning capacity is greater than the maximum capacity of the first compressor and is equal to or less than the second capacity of the second compressor; and
controlling the second compressor to operate at the second capacity and controlling the capacity of the first compressor by applying the frequency outputted from the inverter circuit to correspond to the calculated air conditioning capacity of the first compressor, if the calculated air conditioning capacity is greater than the second capacity of the second compressor.

15. A storage medium storing data to perform a process related to controlling an air conditioning apparatus, the air conditioning apparatus having a plurality of indoor units connected to an outdoor unit, which includes a first compressor having a capacity thereof controlled according to a frequency of an inverter circuit, and a second compressor to operate at one of a first capacity and a second capacity, the process comprising:
calculating an air conditioning capacity required by the corresponding indoor units; and
controlling the first and second compressors so that a total capacity of the first and second compressors is linearly controlled according to the calculated air conditioning capacity,
wherein a maximum capacity of the first compressor is equal to the first capacity of the second compressor, and the second capacity of the second compressor is two or more times greater than the first capacity of the second compressor.

16. The storage medium of claim 15, wherein the controlling comprises:
stopping operations of the first and second compressors, if the calculated air conditioning capacity is 0;
stopping an operation of the second compressor and controlling the capacity of the first compressor by applying the frequency outputted from the inverter circuit to correspond to the calculated air conditioning capacity of the first compressor, if the calculated air conditioning capacity is greater than 0 and is equal to or less than the maximum capacity of the first compressor;
controlling the second compressor to operate at the first capacity and controlling the capacity of the first compressor by applying the frequency outputted from the inverter circuit to correspond to the calculated air conditioning capacity of the first compressor, if the calculated air conditioning capacity is greater than the maximum capacity of the first compressor and is equal to or less than the second capacity of the second compressor; and
controlling the second compressor to operate at the second capacity and controlling the capacity of the first compressor by applying the frequency outputted from the inverter circuit to correspond to the calculated air conditioning capacity of the first compressor, if the calculated air conditioning capacity is greater than the second capacity of the second compressor.

17. An air conditioning apparatus including first and second compressor connected in parallel and operating at different capacities from each other, the air conditioning apparatus comprising:
an oil equalization device to stabilize an oil supply to the first and second compressors by sensing an amount of the oil in the first compressor and comprising:
an oil separator to separate refrigerant and the oil,
a valve disposed between an outflow side of the first compressor and the oil separator to intercept an outflow of the oil to the oil separator; and
at least one capillary tube disposed between an outflow side of the second compressor and the oil separator.

* * * * *